US012623102B2

(12) United States Patent
Kjellman

(10) Patent No.: US 12,623,102 B2
(45) Date of Patent: May 12, 2026

(54) TORSION RELEASE MECHANICAL CONTROL NODE FOR CABLE OPERATED FIRE SUPPRESSION SYSTEMS

(71) Applicant: KIDDE-FENWAL, LLC, Ashland, MA (US)

(72) Inventor: Thomas Kjellman, Uxbridge, MA (US)

(73) Assignee: Kidde-Fenwal, LLC, Ashland, MA (US)

( * ) Notice: Subject to any disclaimer, the term of this patent is extended or adjusted under 35 U.S.C. 154(b) by 343 days.

(21) Appl. No.: 18/316,562

(22) Filed: May 12, 2023

(65) Prior Publication Data

US 2023/0405375 A1 Dec. 21, 2023

Related U.S. Application Data

(60) Provisional application No. 63/344,884, filed on May 23, 2022.

(51) Int. Cl.
*A62C 3/00* (2006.01)
*A62C 37/42* (2006.01)

(52) U.S. Cl.
CPC .............. *A62C 3/006* (2013.01); *A62C 37/42* (2013.01)

(58) Field of Classification Search
CPC ........... A62C 3/00; A62C 3/006; A62C 37/42; A62C 37/44; A62C 37/46; A62C 37/48; F16H 55/36
See application file for complete search history.

(56) References Cited

U.S. PATENT DOCUMENTS

| | | | | |
|---|---|---|---|---|
| 3,039,573 A * | 6/1962 | Gerhardt | A62C 2/18 49/1 |
| 3,515,218 A | 6/1970 | Gardner et al. | |
| 4,979,572 A * | 12/1990 | Mikulec | A62C 3/006 239/524 |
| 2023/0330458 A1 * | 10/2023 | Halawani | A62C 2/10 |

FOREIGN PATENT DOCUMENTS

| | | | |
|---|---|---|---|
| CN | 1481915 A | 3/2004 | |
| CN | 111068227 B * | 12/2020 | A62C 37/48 |
| CN | 114100025 A * | 3/2022 | A62C 31/02 |

OTHER PUBLICATIONS

Extended European Search Report and Written Opinion for European Application No. 23174446.7; Report Mail Date Oct. 13, 2023 (7 Pages).

* cited by examiner

*Primary Examiner* — Joseph Brown
(74) *Attorney, Agent, or Firm* — Honigman LLP

(57) ABSTRACT

An activation system includes a housing and a pulley mounted to the housing. The pulley is rotatable about an axis. An activation member is movable between a first position and a second position relative to the pulley to selectively couple to the pulley. When the activation member and the pulley are coupled, rotation of the pulley about the axis is restricted. A first tension member is operably coupled to the activation member and a first tension of the first tension member maintains the activation member in engagement with the pulley. At least one second tension member is wrapped about at least one of the pulley and the activation member and has a second tension acting on the at least one of the pulley and the activation member.

10 Claims, 7 Drawing Sheets

TORSION RELEASE MECHANICAL CONTROL NODE FOR CABLE OPERATED FIRE SUPPRESSION SYSTEMS

CROSS-REFERENCE TO RELATED APPLICATIONS

This application claims the benefit of U.S. Application No. 63/344,884, filed May 23, 2022, the contents of which are incorporated by reference herein in their entirety.

BACKGROUND

Exemplary embodiments relate to a system and method for delivering a fire suppression agent to a cooking appliance in the event of a fire.

Fire suppression systems, such as in commercial kitchens, commonly include a suppressant reservoir housing a fire suppressant. A valve retains the suppressant in the reservoir until fire is detected, at which point the valve is actuated to allow suppressant to issue from the reservoir and into the area protected by the fire suppression system. Actuation typically occurs by operation of a fusible detection link and cable, which connects the fusible link to the valve.

Fire systems that operate in response to input tension at the detection links (e.g., at the control boxes) are required to work with the limited force and displacement allowed by the link configuration. There is no current mechanism that may be applied in-line and that can multiply the available displacement prior to arrival at the control panel, which, if available, could reduce the need for additional control boxes. Accordingly, there remains a need for a mechanism that may be applied in-line and that can multiply the available displacement prior to arrival at the control panel, reducing the need for additional control boxes.

BRIEF DESCRIPTION

According to an embodiment, an activation system includes a housing and a pulley mounted to the housing. The pulley is rotatable about an axis. An activation member is movable between a first position and a second position relative to the pulley to selectively couple to the pulley. When the activation member and the pulley are coupled, rotation of the pulley about the axis is restricted. A first tension member is operably coupled to the activation member and a first tension of the first tension member maintains the activation member in engagement with the pulley. At least one second tension member is wrapped about at least one of the pulley and the activation member and has a second tension acting on the at least one of the pulley and the activation member.

In addition to one or more of the features described herein, or as an alternative, in further embodiments the first tension member is arranged at an angle to the at least one second tension member.

In addition to one or more of the features described herein, or as an alternative, in further embodiments the first tension member is orthogonally to the at least one second tension member.

In addition to one or more of the features described herein, or as an alternative, in further embodiments the at least one second tension member is wrapped about an exterior of the activation member.

In addition to one or more of the features described herein, or as an alternative, in further embodiments the at least one second tension member is wrapped about an exterior of the pulley.

In addition to one or more of the features described herein, or as an alternative, in further embodiments the at least one second tension member includes a plurality of second tension members and one of the plurality of second tension members is wrapped about the pulley and another of the plurality of second tension member is wrapped about the activation member.

In addition to one or more of the features described herein, or as an alternative, in further embodiments the at least one second tension member includes a plurality of second tension members, wherein one of the plurality of second tension members is wrapped about the pulley and another of the plurality of second tension member is wrapped about the pulley.

In addition to one or more of the features described herein, or as an alternative, in further embodiments a wrap angle of the plurality of second tension members wrapped about the pulley varies.

In addition to one or more of the features described herein, or as an alternative, in further embodiments comprising a shaft, the pulley being mounted to the shaft and a biasing member operably coupled to the activation member, wherein the first tension opposes a biasing force of the biasing member.

In addition to one or more of the features described herein, or as an alternative, in further embodiments the biasing member is arranged within an interior of the shaft.

In addition to one or more of the features described herein, or as an alternative, in further embodiments the activation member further comprises a key and the pulley further comprises a keyway, the key being receivable within the keyway when the activation member is coupled to the pulley.

In addition to one or more of the features described herein, or as an alternative, in further embodiments the housing further comprises an opening axially aligned with the keyway, the key being receivable within the opening when the activation member is coupled to the pulley.

In addition to one or more of the features described herein, or as an alternative, in further embodiments the first tension member is operably coupled to a detection device.

In addition to one or more of the features described herein, or as an alternative, in further embodiments the at least one second tension member is operably coupled to one of a control box and an actuator.

According to an embodiment, a method of operating an activation system includes losing tension acting on a first tension member and moving an activation member out of engagement with a pulley in response to losing tension acting on the first tension member. Moving the activation member out of engagement with the pulley enables the pulley to rotate about an axis in response to a tension acting on the pulley by at least one second tension member.

In addition to one or more of the features described herein, or as an alternative, in further embodiments comprising reducing tension in the at least one second tension member operably coupled to the pulley by rotating the pulley about the axis.

In addition to one or more of the features described herein, or as an alternative, in further embodiments the at least one second tension member includes a plurality of second tension members and moving the activation member out of engagement with the pulley enables the activation member to rotate about the axis in response to the tension acting on the activation member by the one of the plurality of second tension members.

In addition to one or more of the features described herein, or as an alternative, in further embodiments moving the activation member out of engagement with the pulley further comprises separating a key extending from the activation member from a keyway formed in the pulley.

In addition to one or more of the features described herein, or as an alternative, in further embodiments moving an activation member out of engagement with the pulley in response to losing tension acting on the first tension member further comprises biasing the activation member with a biasing force of a biasing member operably coupled to the activation member.

According to an embodiment, an activation system includes a housing and an activation member movable between a first position and a second position relative to the housing to selectively couple to the housing. When the activation member and the housing are coupled, rotation of the activation member about an axis is restricted. A first tension member is operably coupled to the activation member and a first tension of the first tension member maintains the activation member in engagement with the housing. At least one second tension member is wrapped about and has a second tension acting on the activation member.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
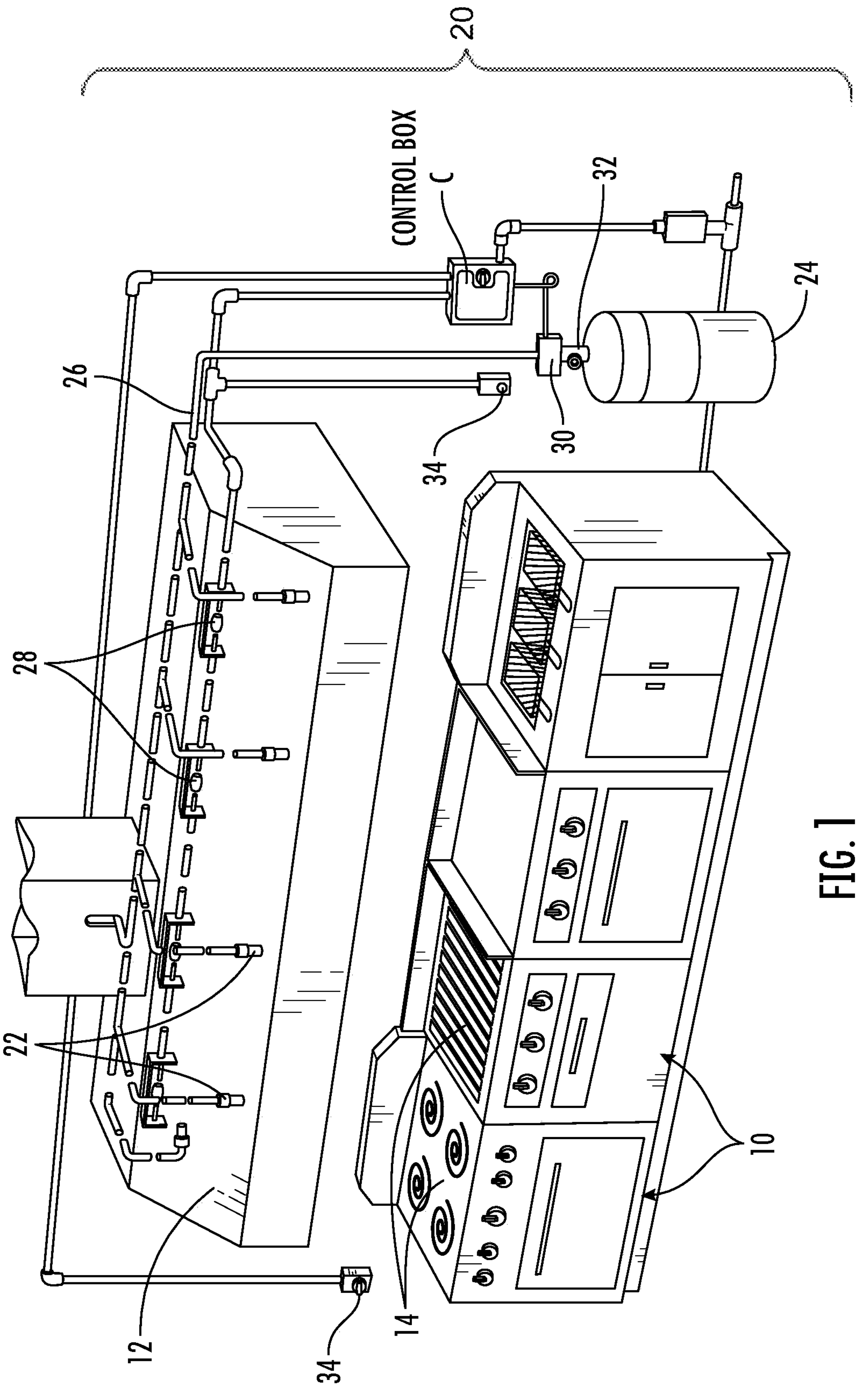
FIG. 1 is a schematic diagram of an exemplary system for delivering a fire suppression agent to at least one cooking appliance according to an embodiment.

With reference now to FIG. 1, an example of a system 20 for delivering a fire suppression agent to one or more cooking appliances 10 is illustrated. The fire suppression system 20 may be located separate or remotely from the cooking appliance 10, such as within a vent hood 12, or alternatively, may be integrated or housed at least partially within a portion of the cooking appliance 10. It should be understood that the configuration of the fire suppression system 20 may vary based on the overall structural design of the cooking appliance 10. The fire suppression system 20 includes one or more spray nozzles 22 associated with the cooking appliance 10 and a source of fire suppression agent 24 in the form of at least one self-contained pressurized canister. In embodiments including a plurality of cooking appliances 10, one or more spray nozzles 22 may be dedicated to each cooking appliance 10, or alternatively, one or more evenly spaced spray nozzles 22 may be used for all of the cooking appliances 10.

The source of fire suppression agent 24 is arranged in fluid communication with the nozzles 22 via an agent delivery path defined by a delivery piping system 26. In the event of a fire, the fire suppression agent is allowed to flow through the delivery piping system 26 to the one or more spray nozzles 22 for release directly onto an adjacent cooking hazard area 14 of the one or more cooking appliances 10.

Those skilled in the art will readily appreciate that the fire suppression agent can be selected from materials such as water, dry chemical agent, wet chemical agent, or the like. Further, the source of fire suppression agent 24 may additionally contain a gas propellant for facilitating the movement of the fire suppression agent through the delivery piping system 26. However, embodiments where the propellant is stored separately from the fire suppression agent are also contemplated herein.

In an embodiment, the fire suppression system 20 is actuated in response to a fire sensing device (illustrated schematically at 28), such as a smoke detector or a heat sensor, for example. In response to heat or smoke exceeding an allowable limit, a control box C will direct a signal to an actuator 30 to open a valve 32 to allow the fire suppression agent to flow from the source 24 to the nozzles 22. For example, in an embodiment the fire sensing device is a heat sensor including an activator bulb. When a fire is present, the increased heat resulting from the flames will cause the activator bulb to break, thereby releasing the tension on an actuation cable connecting the fire sensing device to the control box C. Alternatively, or in addition, the fire suppression system 20 may include a manual activation system 34, also referred to herein as a manual pull station, configured to actuate the control box C to activate the valve 32 to initiate operation of the fire suppression system 20.

Figure 2:
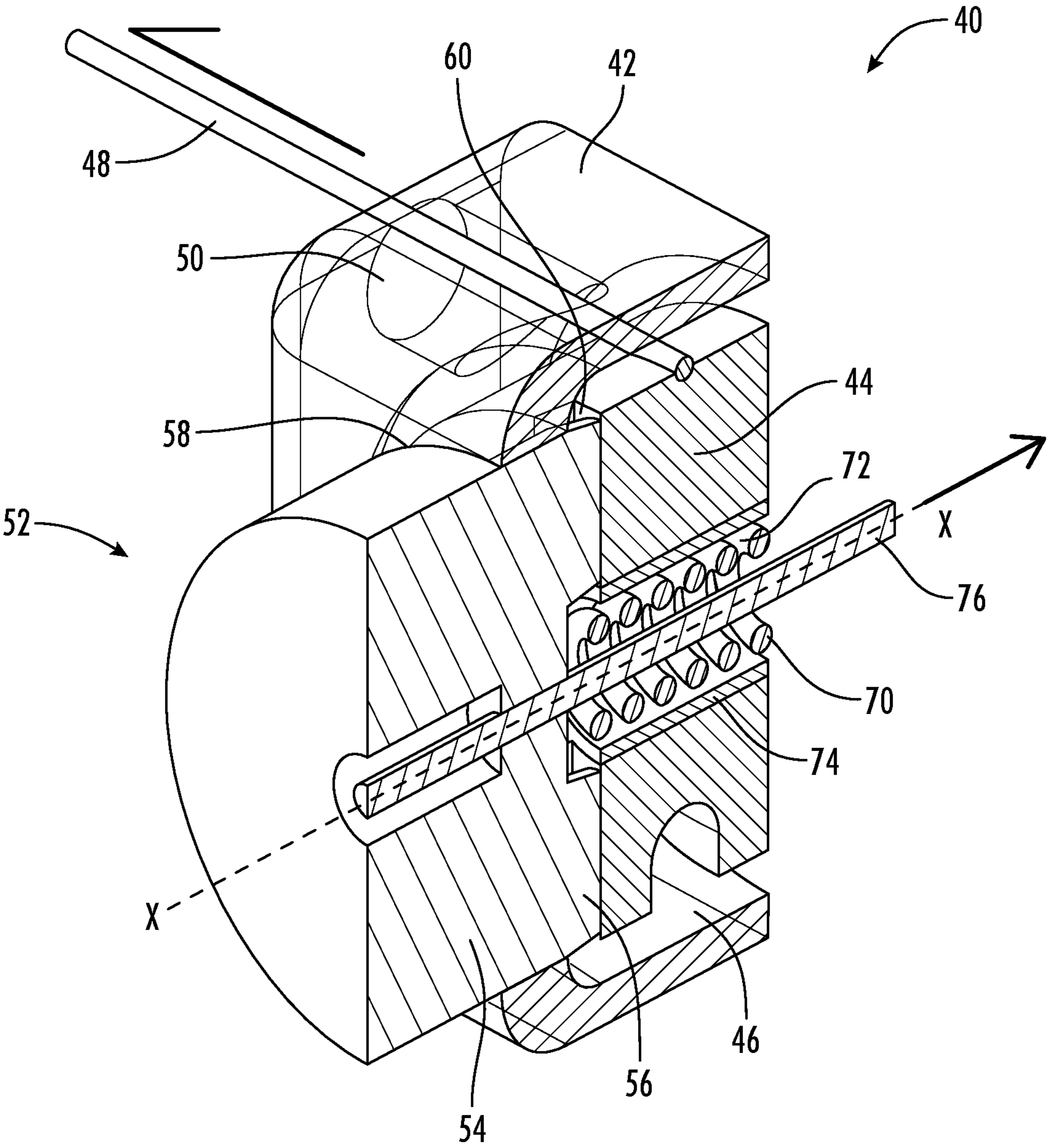
FIG. 2 is a cross-sectional view of an exemplary activation system of a fire suppression system in an inactive configuration according to an embodiment.
Figure 3:
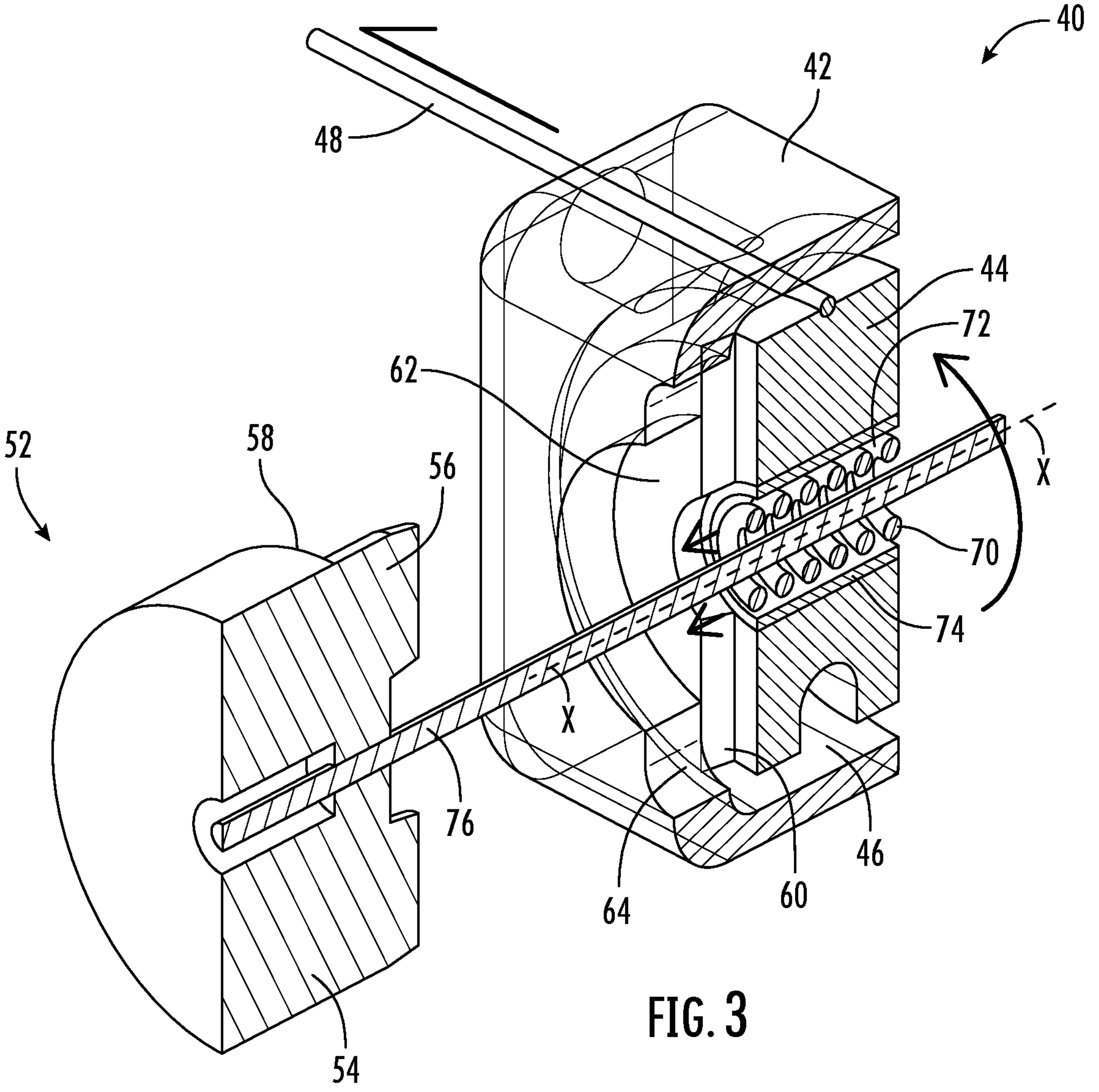
FIG. 3 is a cross-sectional view of the exemplary activation system of a FIG. 2 in an active configuration according to an embodiment.

With reference now to FIGS. 2-3, an example of an activation system 40 is illustrated in more detail. As shown, the activation system 40 includes a housing 42, and a pulley 44 mounted to the housing 42, for example within an interior 46 of the housing 42. At least one tension member 48, such as a rope or cable, for example, is wrapped about a portion of the pulley 44 and may extend through one or more openings 50 in the housing 42. An end of the tension member 48 may be operably coupled to the control box C of the fire suppression system 20. However, it should be understood that embodiments where the tension member 48 is operably coupled directly to the actuator 30 are also within the scope of the disclosure. Further, embodiments where the tension member 48 is operably coupled to another component of the system, such as a damper closure mechanism, a valve, or a switching mechanism for example, are also contemplated herein.

The pulley 44 is transformable between a first inactive configuration (FIG. 2) in which the pulley 44 is rotationally fixed and a second, active configuration (FIG. 3) in which the pulley 44 is freely rotatable about a central axis X relative to the housing 42. When the pulley 44 is in the inactive configuration, as shown in FIG. 2, the tension member 48 applies a force (e.g., tension) on the control box C for the fire suppression system 20 to be in an inactive state. When the pulley 44 transforms to an active configuration, as will be described in more detail below, this tension within the tension member 48, and therefore the force applied in the control box C, is reduced. In response, the control box C will transmit a signal to the actuator 30 to activate the fire suppression system 20. The type of signal transmitted to the actuator 30 may depend on what components within the control box C have been activated. In an embodiment, the reduced tension in the tension member 48 may also be an output of the control box C provided to a downstream component.

The activation system 40 additionally includes an assembly 52 movable between a first position and a second position relative to the pulley 44. When the assembly 52 is in the first position, the assembly 52 is operably coupled to the pulley 44 and is configured to maintain the pulley 44 in an inactive configuration. In the illustrated, non-limiting embodiment, the assembly 52 includes an activation member 54. Although the activation member 54 is illustrated as being generally cylindrical in shape, it should be understood that an activation member 54 having any suitable configuration is within the scope of the disclosure. As noted, the engagement between the activation member 54 and the pulley 44 is operable to restrict rotation of the pulley 44 about its axis X. In the illustrated, non-limiting embodiment, the activation member 54 includes a protrusion 56, such as a key for example, extending from a first end 58 thereof. A keyway 60 (see FIG. 3) for receiving the key 56 therein is formed in an adjacent surface, such as an end 62 for example, of the pulley 44. An opening 64 is formed in the housing 42 in axial alignment with the keyway 60. The opening 64 may but need not be substantially identical in size and shape to the keyway 60. For example, in an embodiment, the opening 64 has a similar shape but is larger than the keyway 60. Accordingly, when the activation member 54 is in the first position, the protrusion or key 56 extends through the opening 64 in the housing 42 into the keyway 60 formed in the pulley 44.

Figure 4:
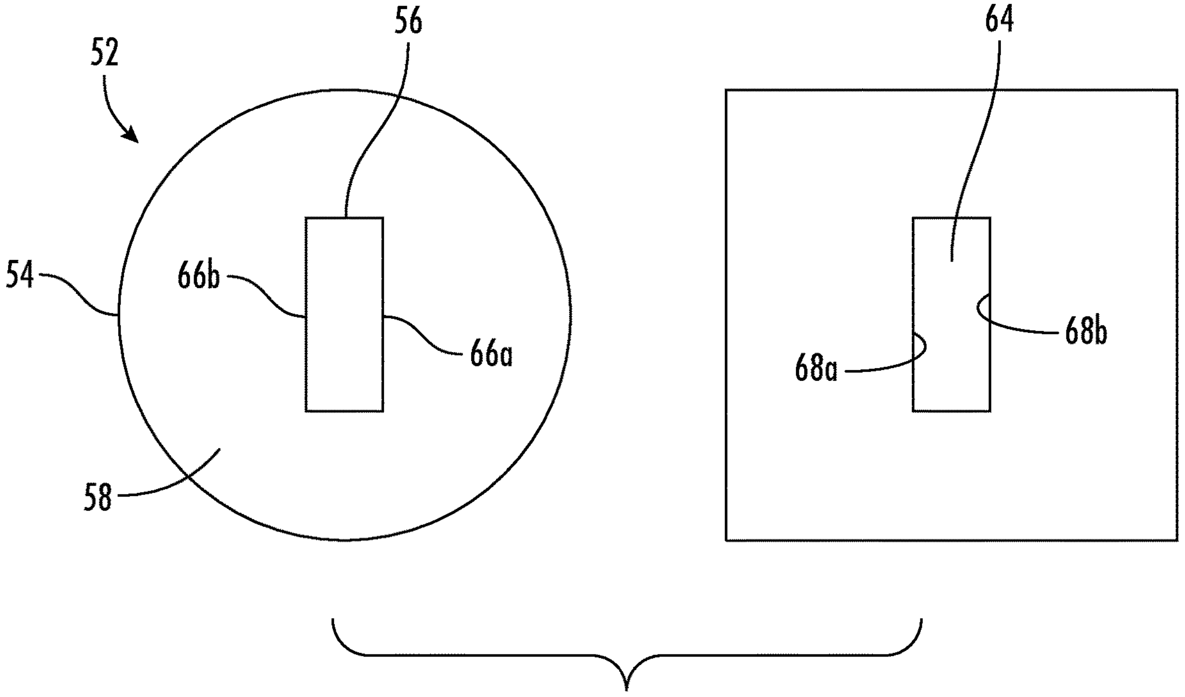
FIG. 4 is a plan view of an exemplary activation member and housing of an activation system according to an embodiment.

Engagement between one or more sides of the key 56 and one or more surfaces of the housing 42 restricts rotation of the activation member 54, and therefore the pulley 44 connected to the activation member 54, in one or more directions. In an embodiment, as shown in FIG. 4, a first side **66*a* of the key 56 is configured to abut a first surface 68*a* of the opening 64 formed in the housing 42 and a second, opposite side 66*b* of the key 56 is configured to abut a second surface 68*b* of the opening 64 formed at an opposite side of the housing 42 to limit rotation about the axis X in both a first direction and a second direction. The clearance between the key 56 and the sides 68*a*, 68*b* of the opening 64 therefore determine the potential movement of the activation member 64 and the pulley 44 when the pulley 44** is in the inactive position.

With continued reference to FIGS. 2 and 3, the assembly 52 may additionally include a biasing member 70 operably coupled to the activation member 54 such that a biasing force of the biasing member 70 is configured to bias the activation member 54 out of engagement with the pulley 44. As shown, the biasing member 70 is configured to bias the activation member 54 axially, towards a position where the key 56 is separated from the keyway 60 of the pulley 44, and in some embodiments, the opening 64 formed in the housing 42. Although the biasing member is shown as a coil spring, a biasing member 70 having another configuration is also contemplated herein. Further, in the illustrated, non-limiting embodiment, the biasing member 70 is arranged within a hollow interior 72 of a shaft 74 of the pulley 44. However, embodiments where the biasing member 70 is arranged at another suitable location, such as between an end 62 of the pulley 44 and a corresponding end 58 of the activation member 54 for example, are within the scope of the disclosure. Further, although the shaft 74 is illustrated as only supporting the pulley 44, embodiments where the activation member is also rotatably supported by the shaft 74 are also contemplated herein.

In the illustrated, non-limiting embodiment, the activation system described herein, is arranged at an intermediate location of the fire suppression system such as between a detection device 28 and the control box C. In such embodiments, the activation system 40 may be used to form an indirect connection between the cable extending from the detection device 28 and the cable extending from the control box C. Accordingly, in an embodiment, another tension member 76 of the fire suppression system 20 may be operably coupled to the activation member 54. As shown, the tension acting on the second tension member 76 during normal operation of the system is configured to oppose the biasing force of the biasing member 70. Accordingly, the tension of the second tension member 76 is operable to maintain the activation member 54 in engagement with the pulley 44, and therefore to maintain the pulley 44 in the inactive position. The second tension member 76 operably coupled to the activation member may be arranged at an angle to the first tension member 48 connected to the pulley 44. In the illustrated, non-limiting embodiment, the tension members 48, 76 and the tension acting on each of the tension members 48, 76 is arranged generally orthogonal to one another. However, it should be understood that embodiments where the first and second tension members 48, 76 are arranged at another non-parallel angle are also contemplated herein.

With reference now to FIG. 3, in operation, upon detection of a fire at a fire sensing or detection device 28, the tension in the second tension member 76 operably coupled to the activation member 54 is removed, such as by breaking the tension member 76 for example. In response to the loss of tension, the biasing force of the biasing member 70 decouples the activation member 54 from the pulley 44 by translating the activation member 54 along the axis X, away from the pulley 44. Once separated, the pulley 44 is in the second configuration and is free to rotate about its axis X. The tension acting on the at least one tension member 48 coupled to the pulley 44 will cause the pulley 44 to rotate relative to the housing 42. In an embodiment, this rotation is sufficient to reduce the tension in the tension member 48. Accordingly, once the activation member 54 has separated from the pulley 44, the pulley 40 is free to move from the inactive position to the active position, thereby sending a signal to the control box C via a lack of cable tension.

The pulley 44 is illustrated and described as having a tension member 48 coupled thereto such that when the pulley 44 rotates about its axis, tension in the tension member 48 is reduced. However, it should be understood that embodiments where a plurality of tension members are coupled to the pulley 44 are also contemplated herein. In such embodiments, rotation of the pulley 44 may release tension in the plurality of tension members. In embodiments including a plurality of tension members 48 coupled to the pulley 44, the wrap angle of the tension members 48 may vary.

With reference now to FIG. 5-7B, in an embodiment, a tension member 80 may be coupled to, such as wrapped about an exterior of the activation member 54. In such embodiments, as shown in FIGS. 6A-7B, the functionality of the pulley 44 previously described herein is integrated into both the activation member 54 and the housing 42. As a result, the activation system 40 need not include a separate pulley 44 mounted to the housing 42. However, in embodiments of the activation system 40 that do include a pulley 44, the tension member 80 may be provided in place of or in addition to the tension member 48 wrapped about the pulley 44.

Figure 5:
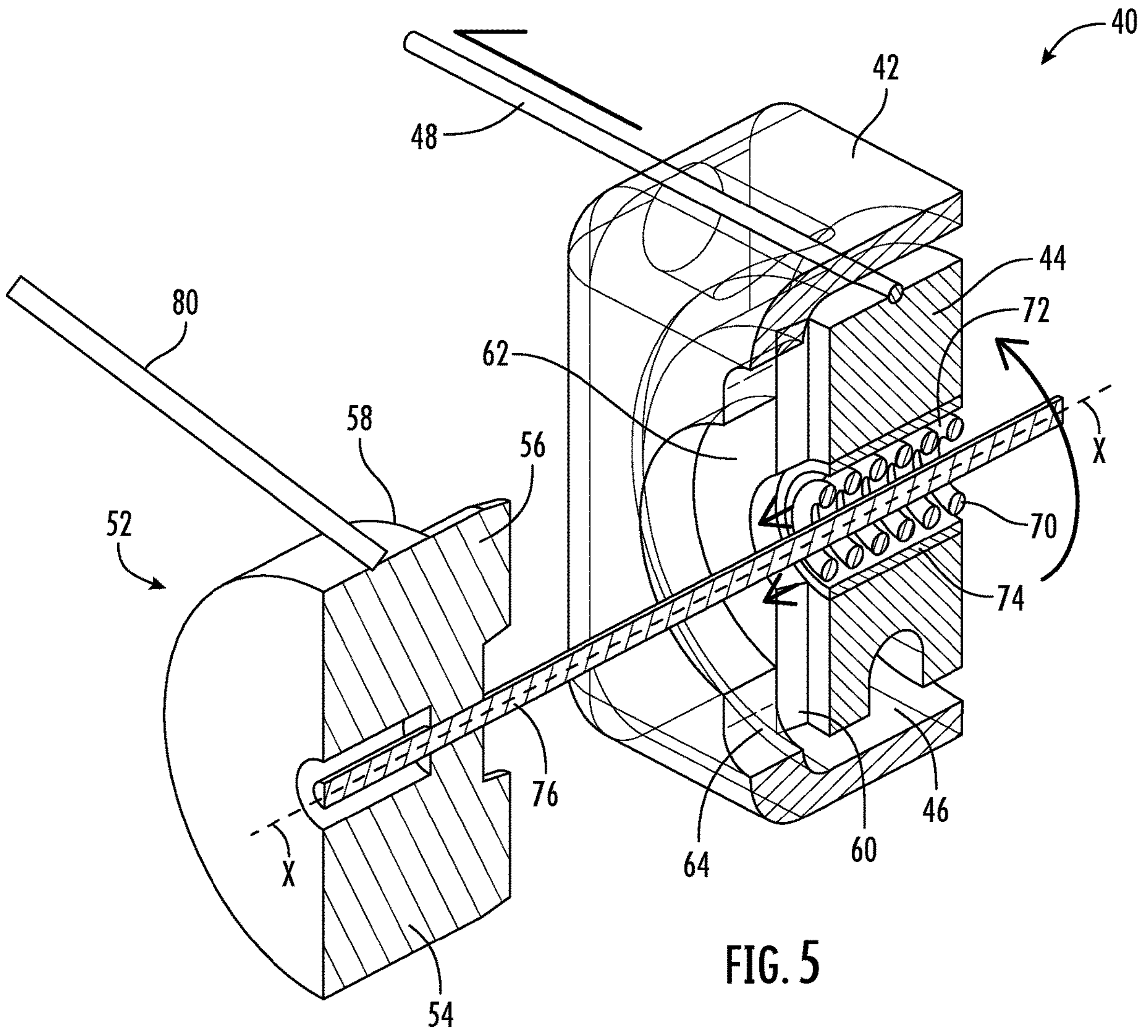
FIG. 5 is a perspective cross-sectional view of an exemplary activation system of a fire suppression system in an active configuration according to an embodiment.
Figure 6A:
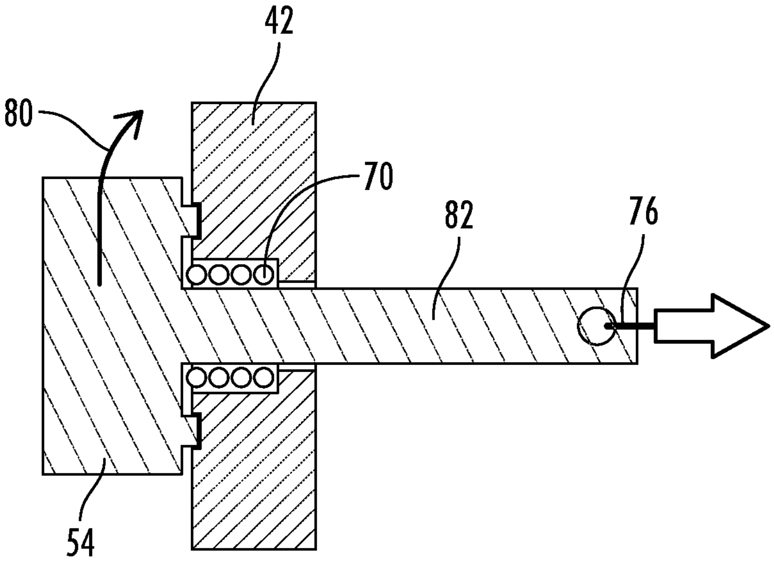
FIG. 6A is a cross-sectional view of an exemplary activation system of a fire suppression system in an inactive configuration according to an embodiment.
Figure 6B:
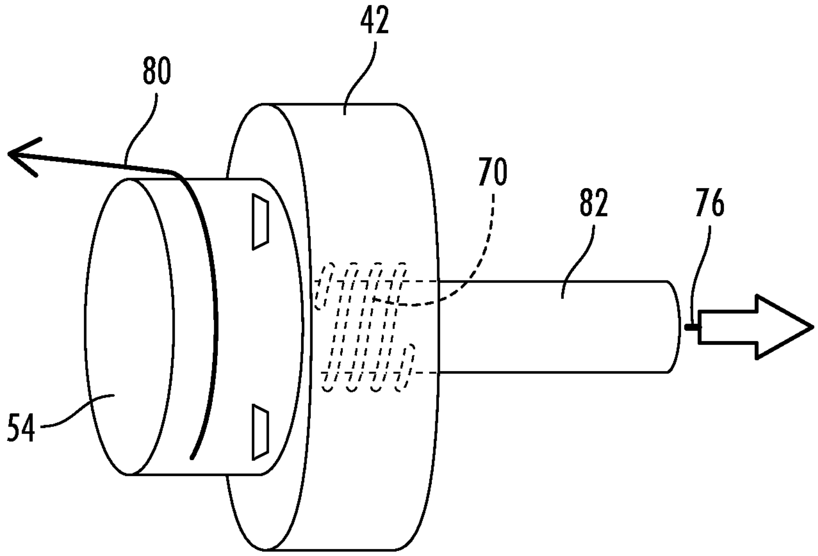
FIG. 6B is a cross-sectional view of the activation system of FIG. 6A in an active configuration according to an embodiment.
Figure 7A:
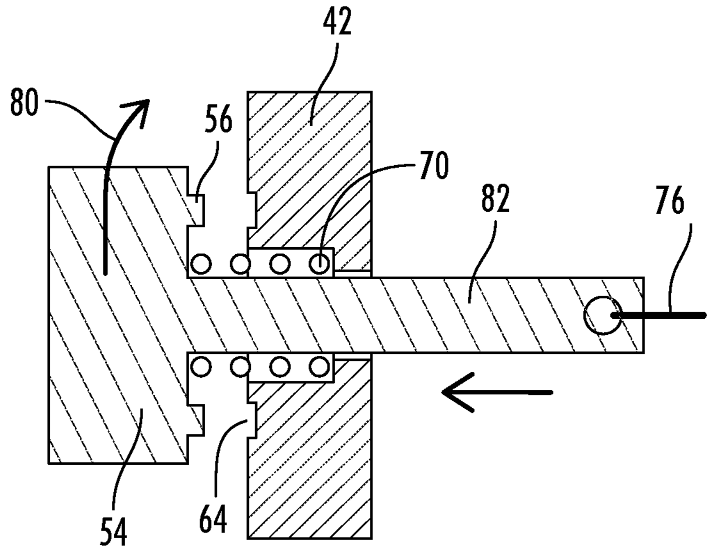
FIG. 7A is a perspective view of the activation system of FIG. 6A in an inactive configuration according to an embodiment.
Figure 7B:
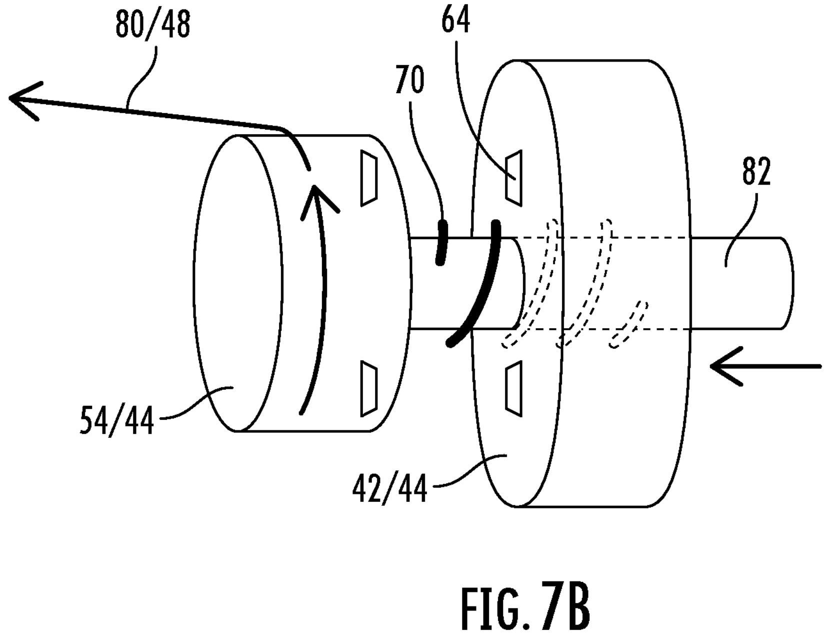
FIG. 7B is a perspective view of the activation system of FIG. 6B in an inactive configuration according to an embodiment.

As previously described, a biasing member 70 may be configured to translate the activation member 54 relative to the housing 42 in response to a loss of tension of the second tension member 76. As shown in FIG. 5, the activation member 54 may translate along the axial length of the shaft 74. Alternatively, in embodiments of the activation system 40 that do not include a pulley 44, the activation member 54 may include an elongated shaft 82 that extends through an opening formed in the housing 42, and the activation member 54 is moved by the biasing member 70 along the axis defined by the elongated shaft 82. In such embodiments, the second tension member 76 may be connected to the free end of the elongated shaft 82.

Upon separation of the protrusion 56 of the activation member 54 from the keyway 60 of the pulley 44 and/or the opening 64 formed in the housing 42, the activation member 54 is configured to rotate about the axis X, thereby reducing the tension in the tension member 80 coupled thereto. Further, in embodiments including an activation member 54 and a pulley 44, both the activation member 54 and the pulley 44 may both be rotationally fixed to the shaft 74. However, embodiments where the activation member 54 is rotatable relative to the pulley 44, such as at a different speed or in a different direction than the pulley 44 are also contemplated herein.

An activation system 20 as illustrated and described herein allows for detection cable displacement to be converted into a larger displacement value upstream from the control box C. Further, this in-line activation system 40 allows for the tension in the detection cable to be isolated from the tension in the controlled elements, such as the actuator 30 for example. This may facilitate control of elements with mismatched force and/or displacement requirements using a factory installation. Such an activation system 40 may even eliminate the need for the control box C.

The term “about” is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An activation system comprising:

a housing;

a pulley mounted to the housing, the pulley being rotatable about a shaft defining an axis;

an activation member disposed on the shaft and movable along the shaft between a first position where the activation member is coupled to the pulley and a second position wherein the activation member is free of the pulley, wherein when the activation member is in the first position and coupled to the pulley, a rotation of the pulley about the axis is restricted;

a first cable operably coupled to the activation member, wherein a first tension of the first cable exerts a tension in a first direction to maintain the activation member in engagement with the pulley;

a biasing member operably coupled to the activation member and configured to continuously urge the activation member to the second position, wherein the first tension opposes a biasing force of the biasing member; and a second cable wrapped about the pulley, the second cable having a second tension acting on the pulley; wherein a release of tension by the first cable allows the biasing member to move the activation member to the second position so as to be free of the pulley, allowing the second cable to rotate the pulley.

2. The activation system of claim 1, wherein the first cable is arranged at an angle to the second cable.

3. The activation system of claim 2, wherein the first cable is orthogonal to the second cable.

4. The activation system of claim 1, wherein a third cable is wrapped about an exterior of the activation member.

5. The activation system of claim 1, wherein the second cable is wrapped about an exterior of the pulley.

6. The activation system of claim 1, wherein the biasing member is arranged within an interior of the shaft.

7. The activation system of claim 1, wherein the activation member further comprises a key and the pulley further comprises a keyway, the key being receivable within the keyway when the activation member is coupled to the pulley.

8. The activation system of claim 7, wherein the housing further comprises an opening axially aligned with the keyway, the key being receivable within the opening when the activation member is coupled to the pulley.

9. The activation system of claim 1, wherein the first cable is operably coupled to a detection device.

10. The activation system of claim 1, wherein the second cable is operably coupled to one of a control box and an actuator.

* * * * *